United States Patent
Nguyen et al.

(10) Patent No.: US 10,218,706 B2
(45) Date of Patent: Feb. 26, 2019

(54) SYSTEM AND METHOD OF SUPERVISORY CONTROL

(71) Applicant: Sony Interactive Entertainment Inc., Tokyo (JP)

(72) Inventors: Quoc Dat Nguyen, London (GB); Robert Christopher Starkey, London (GB); Simon Alexis Fleming, London (GB)

(73) Assignee: Sony Interactive Entertainment Inc. (JP)

( * ) Notice: Subject to any disclaimer, the term of this patent is extended or adjusted under 35 U.S.C. 154(b) by 163 days.

(21) Appl. No.: 15/179,237

(22) Filed: Jun. 10, 2016

(65) Prior Publication Data

US 2016/0366147 A1  Dec. 15, 2016

(30) Foreign Application Priority Data

Jun. 11, 2015 (GB) .................................. 1510184.3

(51) Int. Cl.
*G06F 21/00* (2013.01)
*H04L 29/06* (2006.01)
(Continued)

(52) U.S. Cl.
CPC .......... *H04L 63/102* (2013.01); *G06F 21/629* (2013.01); *G06F 21/6218* (2013.01);
(Continued)

(58) Field of Classification Search
None
See application file for complete search history.

(56) References Cited

U.S. PATENT DOCUMENTS 6,213,879 B1 * 4/2001 Niizuma ............... H04L 7/0008
                                                           463/36
7,640,336 B1   12/2009 Lu et al.
(Continued)

FOREIGN PATENT DOCUMENTS

WO   2006123318 A2   11/2006
WO   2006123318 A3   11/2006
(Continued)

OTHER PUBLICATIONS

Examination Report corresponding to Application GB1510184.3 dated Oct. 9, 2017.
(Continued)

*Primary Examiner* — Alexander Lagor
(74) *Attorney, Agent, or Firm* — Lerner, David, Littenberg, Krumholz & Mentlik, LLP

(57) ABSTRACT

A method of supervisory control is provided according to aspects of the technology. The method includes setting, at a remote device, at least a first usage control parameter for at least a first account associated with access to content on a class of entertainment devices. The method also includes monitoring, at an entertainment device of that class, which account or accounts are active on the entertainment device and obtaining, at the entertainment device, the at least first usage control parameter set for the at least first account. The method further includes restricting usage of content on the entertainment device responsive to the at least first usage control parameter.

13 Claims, 3 Drawing Sheets

(51) Int. Cl.
    *H04N 21/45*     (2011.01)
    *H04N 21/478*    (2011.01)
    *H04N 21/6543*   (2011.01)
    *G06F 21/62*     (2013.01)

(52) U.S. Cl.
    CPC ..... *H04N 21/4532* (2013.01); *H04N 21/4781* (2013.01); *H04N 21/6543* (2013.01)

(56) References Cited

U.S. PATENT DOCUMENTS

| | | | |
|---|---|---|---|
| 8,298,087 B1 | 10/2012 | Smith | |
| 8,346,953 B1 | 1/2013 | Flew et al. | |
| 9,043,826 B1 | 5/2015 | Patil et al. | |
| 2007/0013515 A1* | 1/2007 | Johnson | A63F 13/10 340/568.1 |
| 2010/0332699 A1* | 12/2010 | Genda | G06F 13/385 710/63 |
| 2011/0185437 A1 | 7/2011 | Tran et al. | |
| 2011/0191686 A1* | 8/2011 | Wolff-Petersen | G06F 15/177 715/735 |

FOREIGN PATENT DOCUMENTS

| | | | |
|---|---|---|---|
| WO | 2011028989 A2 | 3/2011 | |
| WO | 2011028989 A3 | 3/2011 | |
| WO | 2013023175 A1 | 2/2013 | |
| WO | 2013023175 A8 | 2/2013 | |
| WO | WO-2013023175 A1 * | 2/2013 | ............ H04W 4/001 |

OTHER PUBLICATIONS

Combined Search and Examination Report for Application No. GB1510184.3 dated Oct. 30, 2015.
Extended European Search Report for Application No. 16173046.0 dated Aug. 12, 2016.
Examination Report corresponding to EP Application 16173046.0 dated Aug. 2, 2018.
Examination Report corresponding to Application GB1510184.3 dated Aug. 2, 2018.
Examination Report corresponding to Application GB1510184.3 dated Oct. 26, 2018.

* cited by examiner

SYSTEM AND METHOD OF SUPERVISORY CONTROL

CROSS REFERENCE TO RELATED APPLICATIONS

The present application claims the benefit of and priority to GB Application No. 1510184.3, filed Jun. 11, 2015, the entire disclosure of which is incorporated by reference herein.

BACKGROUND OF THE INVENTION

Field of the Invention

The present invention relates to a system and method of supervisory control.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Children and teenagers under supervisory care can spend a considerable amount of time playing with their mobile phones and tablets in an unsupervised manner—for example in the period between the end of school and a parent returning from work, or when a parent is preparing a meal and cannot easily monitor their child's minute-by-minute activities, or when their child is visiting friends.

Systems exist for such mobile phones and tablets in which control software is installed on the phone/tablet that restricts access to applications on the tablet, and this control software is responsive, via a third party service, to parameters set by the parent on a corresponding control panel installed on the parent's phone or tablet.

This enables a parent to control a child/teenager's access to feature of their own device, using a similar device under the parent's control.

It would be desirable to extend this capability to other areas.

SUMMARY OF THE INVENTION

In a first aspect, a method of supervisory control is provided in accordance with claim 1.

In another aspect, an entertainment device is provided in accordance with claim 9.

In another aspect, a push server is provided in accordance with claim 10.

In another aspect, a remote device is provided in accordance with claim 11.

In another aspect, a system is provided in accordance with claim 12.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
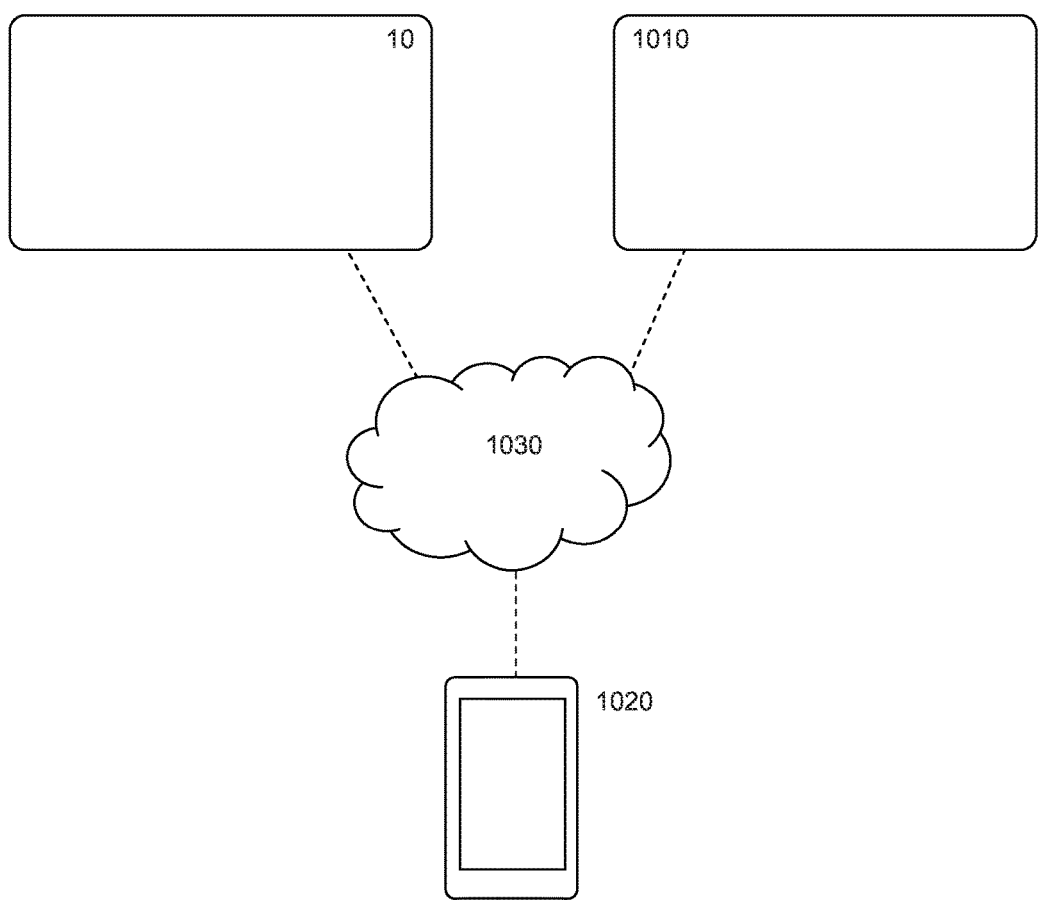
FIG. 1 is a schematic diagram of a system of supervisory control in accordance with an embodiment of the present invention.

Referring now to the drawings, wherein like reference numerals designate identical or corresponding parts throughout the several views, a system and method of supervisory control are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

FIG. 1 illustrates a system for supervisory control of an entertainment device 10 such as the Sony® PlayStation 4® (PS4®), or more generally a domestic videogame console. The PS4 is connected, via the internet 1030, to a push server 1010, which as will be described later herein manages communications between the PS4 and an application on a portable device 1020, also able to communicate with the push server via the internet, and accessible by a person in a supervisory role such as a parent or guardian, or a baby sitter or a facilitator at a youth club or the like. Hereafter and solely for convenience such roles are referred to in a non-limiting manner as parental, and the person in that role as being a parent. Meanwhile, the user whose usage is being supervised may be a child, teenager, or anyone for whom restriction of access is desired (such as for example, prisoners). However again solely for convenience the user may be referred to in a non-limiting manner herein as a child.

The inventors have appreciated that an entertainment device such as the PS4 has a more complex mode of use than a phone or tablet; in particular, it can host multiple accounts and sub accounts, with account/sub account holders having different ages, and having a mix of common access to some applications and individual access to others (for example depending on the nature of the application, such as if part of the OS or purchased using a main account, versus being purchased on/for a sub account).

Furthermore, up to 4 accounts can log into the same PS4 simultaneously, including accounts of users of different PS4s (such as those of friends visiting the current PS4's user). This feature allows each user to be respectively credited with experience points, trophies and the like whilst playing multiplayer games.

Figure 2:
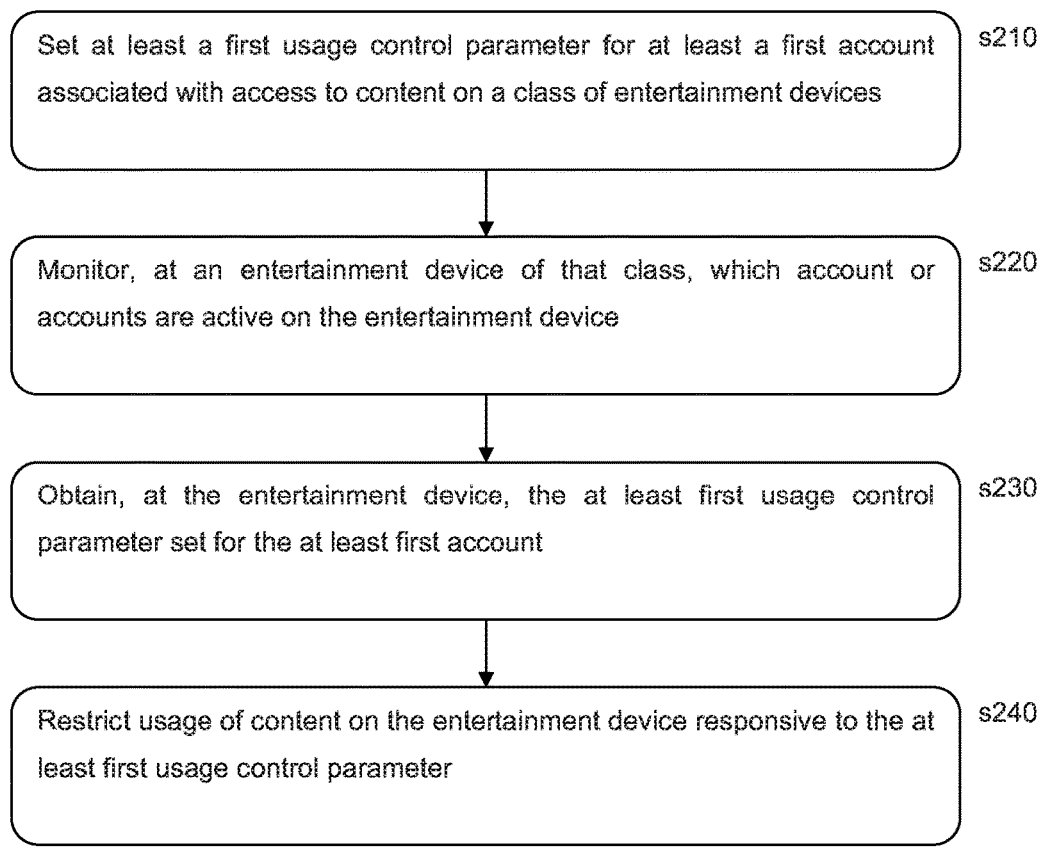
FIG. 2 is a flow diagram of a method of supervisory control in accordance with an embodiment of the present invention.

Consequently, referring now also to FIG. 2, in an embodiment of the present invention a method of supervisory control comprises:

In a first step s210, setting, at a remote device, at least a first usage control parameter for at least a first account associated with access to content on a class of entertainment devices.

The remote device will typically be the parent's mobile phone, tablet, or other internet-enabled device (e.g. PC) that the parent has control over. The at least first usage control parameter will be a value setting some aspect of access to, or use of, a program or feature of a program on an entertainment device. Examples of usage control parameters are described later herein.

The at least first account will typically be a main account or sub account of a child under the parent's supervision. The account is associated with access to content on a class of entertainment devices (and example of a class being PS4s), so that the child may use for example their own PS4 (or a replacement/second PS4), but optionally may also use their account with a friend's PS4 when visiting them.

In a second step s220, the method comprises monitoring, at an entertainment device of that class, which account or accounts are active on the entertainment device. This may be done, for example, by the operating system of the entertainment device, or equally whatever software or hardware component of the device controls account log-ins and hence is able to track verified accounts presently active on the device.

Typically, the log-in process may have an on-line component, notifying an administrator of a network that a user account is active and on-line, for example to notify friends of the user on remote devices, to retrieve messages written for the user, or to enable networked multiplayer gaming.

This notification may include or extend to the push server 1010, which may be dedicated to implementing the supervisory control method described herein for a plurality of accounts/devices, or may be a more general administrative server for one or more other aspects of online account activities (for example messaging), as well as supervisory control.

In a third step s230, the method comprises obtaining, at the entertainment device, the at least first usage control parameter set for the at least first account.

The remote device comprises an app that connects either directly or indirectly to the push server to send it the at least first usage control parameter for the at least first account. Typically the app only contacts the push server in the event of changes to such parameters, or when there is live interaction, as described later herein.

Once the at least first usage control parameter for the at least first account is held by the push server, once that account is used to log into an entertainment device, the push server is notified by that that particular entertainment device that the account is active and online, and can send the at least first usage control parameter for the at least first account to that particular entertainment device.

In a fourth step s240, the method then comprises restricting usage of content on the entertainment device responsive to the at least first usage control parameter. Examples of such restrictions are given later herein.

Notably, by having restrictions associated with an account, such usage restrictions can travel with the child to multiple devices of that class (including devices of that class that the child does not own, and further including devices of that class owned by children/parents who themselves do not use the supervision service). This allows a parent to have the same supervisory control of their child's activities on any device of the same class, whenever it is logged into by the child.

As noted above, an entertainment device can host multiple accounts. Accordingly, if two or more accounts are active on the same entertainment device, the method may comprise the step op restricting usage of content on the entertainment device responsive to the most restrictive version of a usage control parameter respectively associated with the two or more accounts.

Hence for example, if a younger child visits an older child's house, the account of the older child may have had usage parameters set including a maximum game age rating of '12 years' and a maximum play duration of 1.5 hours. Normally, the older child's entertainment device would restrict its operations in response to these parameters. However, if the younger child joins in play and logs into their account, the usage parameters associated with the younger child's account are also obtained by the entertainment device, and the parameters for all accounts currently under supervision are compared.

In one example, the younger child has usage parameters set including a maximum game age rating of '7 years' and a maximum play duration of 1 hour. Accordingly games previously playable by the older child with an age rating of '12 years' will no longer be playable, and the maximum play duration without an enforced break will be 1 hour.

In another example, the parameters are similar except the parents of the younger child have not set a maximum play duration. In this case, where only a subset of accounts have a parameter set, then the most restrictive version of the parameter in the subset is applied. Hence in this case, the maximum game play is 1.5 hours.

It will be appreciated that usage parameters that are not explicitly set may be provided with default values, and/or that values may be adjusted according to certain built-in rules. For example, in the case where the younger child has usage parameters set including a maximum game age rating of '7 years' but no duration parameter, the duration parameter for the 12 year old of 1.5 hours may be scaled on a predetermined scale to set a correspondingly shorter period for a younger user.

Returning to the example of maximum play duration, in an example of the present invention, if two or more accounts are active on the entertainment device, and a first usage control parameter for each account relates to usage of content for a respective predetermined period of time, then the method may comprise restricting usage of content on the entertainment device for a period of time corresponding to the overlap between the respective predetermined periods of time. This can be thought of as similar to a logical 'AND' function for time periods, and applied both to abstract time periods (resulting in limitation to the shortest duration) but also to absolute time schedules, where the play time is limited to the period of overlap.

Thus for example, the older child may be allowed to play between 5 pm and 7 pm, before which they are supposed to do homework. Meanwhile the younger child is allowed to play between 4 pm and 6 pm, so cannot play too late. As a result when both are logged into the same device, they can play together only between 5 pm and 6 pm. Any abstract time period may also be imposed within a scheduled play period, so that, for example, the older child can play for a maximum of 1.5 hours between 5 pm and 7 pm and the younger child can play for a maximum of 1 hour between 4 pm and 6 pm. In this case, the overlap between 5 pm and 6 pm coincides with the smallest maximum playtime, but it will be appreciated that if the overlap were longer, then actual playtime within this overlapping time period may be limited to the shortest maximum time.

In the above scenarios, however, the older child may discourage the younger child from logging into their account, in order to enable play based their own more generous supervision restrictions. More generally, the system can only apply supervision restrictions for active accounts on the device. Consequently there is a risk of abuse.

Accordingly, in an embodiment of the present invention, the method comprises detecting the number of input peripherals operably coupled to the entertainment device; and at least one of the usage control parameters for at least a first account relates to the restriction of usage of content responsive to the number of input peripherals operably coupled to the entertainment device.

This effectively enables the parent to have different settings for 'one player' and 'two player' game modes, where the second players identity is not known because they have not logged in.

Hence a parent of two children can set the older child's restrictions normally, but also set 'two player' restrictions on the older child's account that are suitable to their younger child, on the assumption that the younger child will be the most likely second player.

It will be appreciated that this 'two player' set of restrictions comes into effect if the second player does not log in with their own account. However, as will be described below, such restrictions may be temporarily lifted through live interaction, for example if a friend of similar age to the older child is visiting who does not have an account of their own.

One notable feature of entertainment devices such as the PlayStation 4 is the numerous potential modes of interaction with the device. Input peripherals include, for example, the DualShock 4 (r) 6-Axis controller, the PlayStation Move (r) wand-like controller, and the PlayStation Camera (r) for gesture control. Similarly there are multiple modes for consumption of the output of the entertainment device, such as on 2D TV, 3D TV, remote play (e.g. on a PlayStation Vita (r) and use of the Project Morpheus virtual reality head mounted display.

Accordingly, the method of supervisory control may comprise step of detecting the type of peripherals operably coupled to the entertainment device and at least one of the usage control parameters for at least a first account relates to the restriction of usage of content responsive to the type of peripherals operably coupled to the entertainment device.

This allows the parent to modify parameters according to the type of peripherals being used: for example, the maximum play duration may be shorter if the game is output in 3D than in 2D, to mitigate eye fatigue; similarly the child may not be allowed to play any game with the PlayStation Move while unsupervised, with permission being set by live interaction (e.g. the parent pressing an 'allow' button on their remote device). Similarly, a lower maximum age rating may be set if the child uses a head mounted display instead of a TV, to reflect the more immersive and intense experience of virtual reality.

It will be appreciated again that where multiple accounts are active on the same device, the most restrictive versions of the respective parameters may be used to control overall usage of the entertainment device.

It will be appreciated that occasionally a function of the entertainment device, whether this is a particular game, or a messaging application or a video on demand application, or a web browsing application, or a music application or any other function may be temporarily allowed or restricted by the parent for any reason they deem appropriate.

In the case of allowance, the user interface of the remote device application may allow perusal of what features are currently restricted by any suitable means; for example these may be viewed via a menu tree (for example selecting between media and games, then within media selecting between music, video and web, and within video seeing permissions relating to the viewing of videos). Alternatively or in addition, some all of the restrictions may be visible on a flat list of currently active restrictions. For example time restrictions currently in force may be visible from a homepage or 'restrictions' page of the application. Such a flat list may be context sensitive based upon information supplied by the entertainment device via the push server about the user's current or recent activities or the user's current or recent position within the user interface structure of the entertainment device; hence for example restrictions on watching videos may be included in the flat list if the user is currently in a section of the entertainment device's interface relating to videos or has recently attempted to access a video.

In any event, the parent may choose to allow a previously restricted function, or extend a currently permitted function. Where this is done via the user interface using an override option or otherwise in a manner different to the normal permission settings process, the application may ask the parent for a duration in which to apply this deviation from established settings; for example if the parent allows the child to watch a video, the duration may be set as 2 hours. After this period, the restrictions revert to the previously established settings. The overriding permission is communicated to the push server which in turn passes it to the entertainment device which the relevant account is logged in; the entertainment device then updates its behaviour according to the new permission information.

In the case of restriction (i.e. limiting or preventing access or use of a currently accessible or usable function) then the method of supervisory control may comprise, at the remote device, the step of selecting the restriction of a first function; and at the entertainment device, the step of notifying a user that the first function will be restricted following a predetermined notification period.

Hence again the parent accesses controllable features of the entertainment device via the remote device application, again optionally via a menu tree or via a flat list; typically the pound will be seeking to restrict access to or use of a function that the child is currently interacting with, and so the or each function currently active on the entertainment device may be presented at the top of such a flat list or as its own flat list for ease and speed of review by the parent.

The parent may then press a 'stop' button or otherwise amend the permissions to effectively restrict use or access of the feature. Again where this is being done via an override interface or in a manner other than the normal permission settings process the applicant may ask for duration in which to apply this deviation from established settings.

The overriding restriction is communicated to the push server which in turn passes it to the entertainment device upon which the relevant account is logged in; entertainment device and updated behavior according to the new restriction information. The entertainment device may as a result immediately stop access to or use of a function. However a notable feature of video games on consoles is the complexity of the gameplay and the investment of time and effort by the player in progressing through the game. Consequently most games provide the ability for the user to save the current gameplay state, either explicitly via a menu option or in game by reaching a predetermined point within the game typically referred to as a checkpoint. Consequently where for example the restriction override relates to playing such a game, the entertainment device may notify the child that the game will be disabled after a certain notification period, which may typically be between 30 seconds and 5 minutes. This provides the child with time to save the game state or reach a checkpoint in order to cause the game to save the game state. Optionally games may include meta-data indicative of a preferred notification period for shutdown.

Notably the above situation is different to that on tablets, phones and the like, which tend to dump an entire and game state to memory, enabling resumption at a later time on the assumption that they are effectively powered-on indefinitely.

It will be appreciated that the present system may comprise other features relevant to parental supervision of a child's use of the entertainment device, including a range of restrictions on the use of features of the entertainment device, and a range of reporting features informing the parent of the child's activities on the entertainment device.

The restrictions may include:

Restricting the running of applications according to age ratings or parental control flags
  for example, games with age ratings above a set age may be restricted, as may be games with no clearly set age rating, and/or
  one or more flags may be provided with applications so that common restriction profiles can be applied easily, such as child/teen/adult profiles; depending on the implementation a flag may indicate suitability or unsuitability for one of these profiles, and clearly each profile can be seen as a successive subset of the next profile, so that 'child' restricts use to only those applications with a 'child' flag, whereas 'teen' restricts use to those applications with a 'teen' flag or a 'child' flag. Meanwhile an adult profile may ignore the flags and provide full access,
the maximum age or the or each flag being example usage control parameters.

Restricting use of an application
For applications in general
Configure a configurable unit of the application to restrict access to predetermined features (for example multiplayer play, where single player and multiplayer options are available by default). As noted elsewhere herein, the application or a supervising operating system can call a parental control API either within the game or within the operating system to send a message via the push server to the remote device comprising a list of configurable application features that could be restricted, and to receive via the push server from the remote device corresponding usage control parameters (such as a list of access flags), and optionally to provide via the push server notifications to the remote device such as attempts to use such restricted features.
Where the application is a web browser
for example preventing use altogether, or
only enabling access to a white list of domains, the white list being provided either by the proprietor of the network to which the account is logged in, or the parent (for example via interface on the device and/or the entertainment device),
an access flag or the white list being example usage control parameters.

Where the application is a chat or messaging function
for example preventing use altogether, or
limiting use to messages to/from friends on a friends list,
a usage flag or approved friend list being example usage control parameters.

Setting a cap on spending for a particular account, the cap being an example usage control parameter.

Locking a child out from access to their account
for example by changing a password
the lock notification and new password being example usage control parameters.

Setting a maximum duration for play
  for example usage of the entertainment device on a single block of time, or
  cumulative use within a defined period such as 24 hours,
  as noted above, optionally modified either by the parent or automatically in response to what peripherals are being used,
respective maximum duration values being example usage control parameters.

Setting scheduled periods for play
  for example absolute times between which the child can access features of entertainment device, optionally set for a single day schedule or set for a 7 day schedule, allowing for example more generous time at the weekend,
such absolute times being example usage control parameters.

Restricting specific titles from being launched
  for example certain games that the parent know tend to over excite their child may be restricted on weekdays, or may be restricted after 5 pm,
selected game titles and/or game specific schedules being example usage control parameters.

Hence more generally individual games may be scheduled separately, and/or to simplify setting the system up, games may be scheduled together to create a default schedule, and then individual games may be rescheduled separately. Similarly, alternatively or in addition, separate classes of games based on age rating or other descriptors suitable for grouping (e.g. game meta data indicating 'racing games') may each be scheduled.

As illustrated in the examples above, it will be appreciated that the these restrictions may be defined by usage control parameters as described herein with parameter values typically but not exclusively taking the form of on/off, allow/disallow, none/friends/all, an age value, an override indicator, a time value, and/or the selection of a particular option (such as allowed peripherals within a list, or allowed games within a list), as applicable.

Meanwhile, reporting features may include:
Monitoring current activities
  for example what game is being played, optionally together with user message about the game such as age rating and/or game type;
  how long a game has been played for;
  whether messaging is being used; and/or
  the contents of messages sent and/or received
Monitoring historical activities
  for example looking at what applications out of the available library the child has been using in the past day/week/month to determine whether a child is devoting the time solely to one application;
  looking at changes in duration of use or time of use of the entertainment device; and/or
  looking at behaviours within a weekly cycle; for example comparing Mondays against Mondays, or building up profiles of typical behaviour for each day of the week
Finally, live interaction may take the form of:
Receiving live notifications
  for example when a child logs into their account, starts a game or other application, makes a purchase, and/or stops play, and/or
receiving an image snapshot or short video clip of the current activity on the entertainment device (i.e. the entertainment device capture screenshots/video of the current output and send these to the push server, to relay to the remote device; this can be done in response to a request from the parent, to reduce unnecessary upload bandwidth associated with continuous or periodic uploading). Audio clips may also be provided in a similar manner Closing an application for example as noted above enabling remote termination of a current application, optionally with the facility for a countdown to termination in the case of video games where it would be preferable to save the current game state.

Sending/receiving messages for example, allowing the parent to send a text style message via the push server to the entertainment device, for example informing the child that they can play for another 15 minutes, or telling them it's time to come home from a friends.

Similarly, allowing the child to send a message to the parent, for example to ask for additional time in response to notification that an application is about to be terminated. Optionally the parent is in control of whether or not the child can send messages, in order to limit the scope for begging messages for additional time, funds, access to games and the like.

Updating restrictions/permissions

For example, if a child is approaching the end of their previously scheduled play period but the parish decides to reward the child with a time extension, then a modification to the relevant schedule is conveyed from the phone immediately to the push server and there on to whichever entertainment device the relevant account is logged in to.

More generally, typically after an initial setup process in which default restrictions are created for the or each child, any change to a restriction parameter is conveyed immediately to the push server and thereon to whichever entertainment device the relevant account is logged in to.

Figure 3:
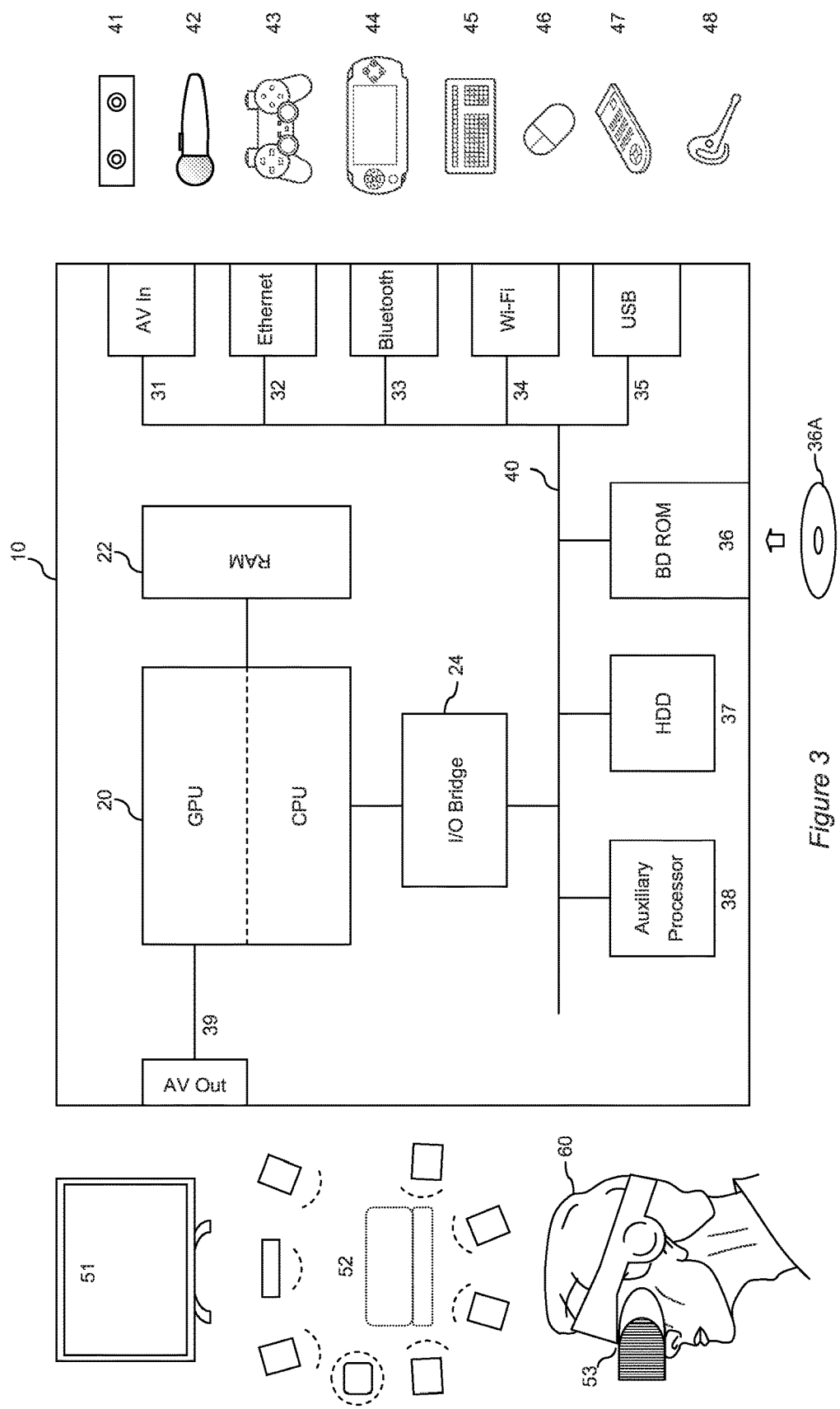
FIG. 3 is a schematic diagram of an entertainment device in accordance with an embodiment of the present invention.

As noted previously herein, the entertainment device may be a Playstation 4. FIG. 3 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as Orbis OS®, a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

It will be appreciated that a separate Entertainment Device may also operate as a push server as described herein, although typically a conventional server may be used in preference.

Referring back to FIG. 2, in a summary embodiment of the present invention, a method of supervisory control, comprises a first step s210 of setting, at a remote device, at least a first usage control parameter for at least a first account associated with access to content on a class of entertainment devices; a second step s220 of monitoring, at an entertainment device of that class, which account or accounts are active on the entertainment device; a third step s230 of obtaining, at the entertainment device, the at least first usage control parameter set for the at least first account; and a fourth step of restricting usage of content on the entertainment device responsive to the at least first usage control parameter.

As noted above, the remote device is typically a smart phone or tablet upon which an app is loaded that provides the user interface to the parent for selecting the or each account (for example by entering the account's username and password), and setting usage parameters for it. It will be appreciated that for controlling a domestic videogames console, the class of entertainment devices corresponds to a cross-compatible set of devices upon which the same account can be used to access content; hence for example several variants of the PlayStation 4, having different physical sizes, or different hard disk types, are all of the same class, for the purposes of the present invention. Notably, however, are of a different class to the remote devices used to set the control parameters.

In an instance of the summary embodiment, two or more accounts are active on the entertainment device, and the method comprises restricting usage of content on the entertainment device responsive to the most restrictive version of a usage control parameter respectively associated with the two or more accounts.

As noted above, this approach safeguards the interest of the younger or more vulnerable player where two or more players are logged into the same device.

In an instance of the summary embodiment, where two or more accounts are active on the entertainment device, and a first usage control parameter for each account relates to usage of content for a respective predetermined period of time, the method comprises restricting usage of content on the entertainment device for a period of time corresponding to the overlap between the respective predetermined periods of time.

As noted above, this allows for sensible management of play where different children either of different ages or with different demands on their time (e.g. from homework) share an entertainment device; each child can play within their own scheduled period, and where this overlaps, both children can play together.

In an instance of the summary embodiment, the method comprises detecting the number of input peripherals operably coupled to the entertainment device, and at least one of the usage control parameters for at least a first account can relate to the restriction of usage of content responsive to the number of input peripherals operably coupled to the entertainment device.

As noted above, this allows a parent to set a default position for dual play in the home where the second player either does not have their own account, or has not logged on to their own account. In this way, the parent may protect the interests of a young child by preventing them from playing a more mature game with an older sibling.

In an instance of the summary embodiment, the method comprises detecting the type of peripherals operably coupled to the entertainment device, and at least one of the usage control parameters for at least a first account relates to the restriction of usage of content responsive to the type of peripherals operably coupled to the entertainment device.

As noted above, different peripherals may change the emotional impact of a game and hence warrant a different maximum age rating for the child when that peripheral is used. Some modes of display may be more tiring to use, or inadvisable for a young child to use, and so may be disabled or further time-restricted. Similarly, some peripherals may require more physical exertion or may be more stimulating, and so their use may be subject to different time restrictions (for example, limiting use before bedtime).

In an instance of the summary embodiment, the method comprises, at the remote device, selecting the restriction of a first function; and at the entertainment device, notifying a user that the first function will be restricted following a predetermined notification period.

As noted above, this allows the parent to directly control access or use of a current application on the entertainment device, but provides a brief window of time for the child to save the game (or send a message to their parent asking for more time; the parent can cancel the command to stop the application).

In an instance of the summary embodiment then as noted above the usage control parameters may relate to one or more selected from the list consisting of:
i. Restricting the running of applications according to age ratings or parental control flags;
ii. Restricting use of a web browser;
iii. Restricting use of chat or messaging functions;
iv. Setting a cap on spending for a particular account;
v. Locking a user out from access to their account;
vi. Setting a maximum duration for play;
vii. Setting scheduled periods for play;
viii. Restricting specific titles from being launched; and
ix. Restricting access to an application feature listed in a configurable application feature message.

In an instance of the summary embodiment, the method comprises, at the entertainment device, reporting an activity to the push server; and at the remote device, receiving a report on the activity.

As noted above, this allows the parent to be notified on a real-time basis of the child's activities on the entertainment device. The remote device can push alerts to the parent, or the parent can interrogate an app on the device, depending on designer choice or parent preferences.

In an instance of the summary embodiment, the method comprises, at the remote device, composing a message, and transmitting the message to the push server; and at the entertainment device, displaying the message.

As noted above, this allows the parent to display a message to the child that appears within the display currently being attended to by the child; this is more effective and immediate than sending a text to the child's phone, for example, and also does not rely on the child having such as secondary communication device.

In a summary embodiment of the present invention, an entertainment device 10 (such as the PlayStation 4 under suitable software instruction) comprises a log-in processing unit (such as APU 20, in conjunction with an input such as USB 35 or Bluetooth® receiver 33) adapted to allow plural accounts to log in on the entertainment device; a monitoring processing unit (such as APU 20) adapted to monitor which account or accounts are active on the entertainment device; a transmitter (such as APU 20 in conjunction with a network connector such as Wi-Fi® port 34 and/or Ethernet® port 32) to transmit notification of which account or accounts are active on the entertainment device to a push server 1010; a receiver (such as APU 20 in conjunction with network connector such as Wi-Fi® port 34 and/or Ethernet® port 32) adapted to receive at least a first usage control parameter of at least one account active on the entertainment device from the push server; and a restriction processing unit (such as APU 20) adapted to restrict usage of content on the entertainment device responsive to the at least first usage control parameter.

In a summary embodiment of the present invention, a push server 1010 (which may be a PlayStation 4 under suitable software instruction, but more typically a conventional push server under suitable software instruction), comprises an account database (for example, held in RAM 22) adapted to hold data for a plurality of accounts associated with respective access to content on a class of entertainment devices; a receiver (such as APU 20 in conjunction with a network connector such as Wi-Fi® port 34 and/or Ethernet® port 32) for receiving, from a remote device 1020, at least a first usage control parameter set for at least a first account; an association processing unit (such as APU 20 in conjunction with a memory such as RAM 22) for associating the at least a first usage control parameter with the at least a first account in the plurality of accounts held by the push server; a receiver (such as APU 20 in conjunction with a network connector such as Wi-Fi® port 34 and/or Ethernet® port 32) for receiving notification from an entertainment device that the first account is active on the entertainment device; and a transmitter (such as APU 20 in conjunction with a network connector such as Wi-Fi® port 34 and/or Ethernet® port 32) for transmitting to the entertainment device the at least first usage control parameter set for the at least first account.

In a summary embodiment of the present invention, a remote device 1020 (such as a conventional mobile phone or table capable of running third party apps), comprises account a selection processing unit (such as a CPU of the device operating under instruction of an app) adapted to select at least a first account associated with access to content on a class of entertainment devices; a setting processing unit (such as a CPU of the device operating under instruction of an app) adapted to set at least a first usage control parameter for the at least a first account; and a transmitter (such as a CPU of the device in conjunction with a mobile data transmitter of the device or a Wi-Fi® port for communication to a network) adapted to transmit an indication of the or each selected account and the respective at least first usage control parameter for the or each selected account to a push server.

In a summary embodiment of the present invention, a system of supervisory control comprises the entertainment device described previously herein, and the push server described previously herein.

It will be appreciated that the push server may supply default usage control parameters to an entertainment device in response to basic details about the account holder, such as their age, independent of whether specific restriction parameters have been set by a parent using a remote device.

However, in an instance of this summary embodiment the system also comprises the remote device discussed previously herein.

It will be appreciated from the above discussion that the entertainment device, push server and remote device may be adapted to implement the present invention by suitable software instruction.

Hence the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of supervisory control, comprising the steps of:
   setting, at a remote device, a first usage control parameter for a first account associated with access to content on a class of entertainment devices;
   monitoring, at an entertainment device of belonging to the class of entertainment devices, which one or more account or accounts that are active on the entertainment device;
   detecting in a first instance, by one or more processors, one or both of a number of input peripherals that are coupled to the entertainment device and a type of the input peripherals coupled to the entertainment device;
   detecting in a second instance, by one or more processors, a type of the input peripherals that are coupled to the entertainment device;
   obtaining, at the entertainment device, the first usage control parameter set for the first account; and
   restricting, by one or more processors, usage of content on the entertainment device responsive to the first usage control parameter;
   wherein, in the first instance, the first usage control parameter for the first account restricts usage of content based on one or both of the detected number of the input peripherals or the detected type of the input peripherals coupled to the entertainment device, and
   wherein, in the second instance, the first usage control parameter for the first account restricts usage of content based on the detected type of the input peripherals that are coupled to the entertainment device.

2. A method of supervisory control according to claim 1, in which two or more accounts are active on the entertainment device, wherein:
   restricting the usage of content on the entertainment device is responsive to a most restrictive version of a usage control parameter respectively associated with the two or more accounts.

3. A method of supervisory control according to claim 1, in which
   two or more accounts are active on the entertainment device, and
   a given usage control parameter for each account relates to usage of content for a respective predetermined period of time, wherein restricting the usage of content on the entertainment device is done for a period of time corresponding to an overlap between the respective predetermined periods of time for each account.

4. A method of supervisory control according to claim 1, comprising the step of:
   at the remote device:
   selecting the restriction of a first function; and
   at the entertainment device:
   notifying a user that the first function will be restricted following a predetermined notification period.

5. A method of supervisory control according to claim 1, in which the first usage control parameter relates to one or more selected from the list consisting of:
   i. restricting running of applications according to age ratings or parental control flags;
   ii. restricting use of a web browser;
   iii. restricting use of chat or messaging functions;
   iv. setting a cap on spending for a particular account;
   v. locking a user out from access to their account;
   vi. setting a maximum duration for play;
   vii. setting scheduled periods for play;
   viii. restricting specific titles from being launched; and
   ix. restricting access to an application feature listed in a configurable application feature message.

6. A method of supervisory control according to claim 1, comprising the steps of:
   at the entertainment device:
   reporting an activity to a push server; and
   at the remote device:
   receiving a report on the activity.

7. A method of supervisory control according to claim 1, comprising the steps of:
   at the remote device:
   composing a message, and transmitting the message to a push server; and at the entertainment device:

displaying the message.

8. A non-transitory machine-readable recording medium comprising a computer program product that when executed on a computer implements the steps of:

setting, at a remote device, a first usage control parameter for a first account associated with access to content on a class of entertainment devices;

monitoring, at an entertainment device of belonging to the class of entertainment devices, which account or one or more accounts that are active on the entertainment device;

detecting in a first instance one or both of a number of input peripherals that are coupled to the entertainment device and a type of the input peripherals coupled to the entertainment device;

detecting in a second instance a type of the input peripherals that are coupled to the entertainment device;

obtaining, at the entertainment device, the first usage control parameter set for the first account; and restricting usage of content on the entertainment device responsive to the first usage control parameter;

wherein, in the first instance, the first usage control parameter for the first account restricts usage of content based on one or both of on the detected number of the input peripherals coupled to the entertainment device or the type of the input peripherals coupled to the entertainment device, and wherein, in the second instance, the first usage control parameter for the first account restricts usage of content based on the type of the input peripherals that are coupled to the entertainment device.

9. An entertainment device, comprising:

a log-in processing unit adapted to allow plural accounts to log in on the entertainment device;

a monitoring processing unit adapted to monitor which account or one or more accounts that are active on the entertainment device;

a detecting processing unit adapted to detect, in a first instance, one or both of a number of input peripherals that are coupled to the entertainment device and to detect, in a second instance, a type of the input peripherals that are coupled to the entertainment device;

a transmitter adapted to transmit notification of which account or the accounts that are active on the entertainment device to a push server;

a receiver adapted to receive a first usage control parameter of at least one account active on the entertainment device from the push server; and a restriction processing unit adapted to restrict usage of content on the entertainment device responsive to the first usage control parameter;

wherein, in the first instance the first usage control parameter for the first account restricts usage of content based on one or both of on the number of input peripherals coupled to the entertainment device, and in the second instance the first usage control parameter restricts usage of content based on or the type of the input peripherals that are coupled to the entertainment device.

10. A push server, comprising an account database adapted to hold data for a plurality of accounts associated with respective access to content on a class of entertainment devices;

a receiver adapted to receive, from a remote device, a first usage control parameter set for a first account;

an association processing unit adapted to associate the first usage control parameter with the first account in the plurality of accounts held by the push server;

a receiver adapted to receive notification from an entertainment device that the first account is active on the entertainment device; and a transmitter adapted to transmit to the entertainment device the at least the first usage control parameter set for the first account;

wherein in a first instance the first usage control parameter for the first account restricts usage of content based on one or both of a detected number of input peripherals that are coupled to the entertainment device and in a second instance the first usage control parameter restricts usage of content based on a detected type of the input peripherals that are coupled to the entertainment device.

11. A remote device, comprising an account selection processing unit adapted to select a first account associated with access to content on a class of entertainment devices;

a setting processing unit adapted to set a first usage control parameter for the first account; and a transmitter adapted to transmit an indication of each selected account and the respective first usage control parameter for each selected account to a push server;

wherein in a first instance the first usage control parameter for the first account restricts usage of content based on one or both of a detected number of input peripherals that are coupled to a given entertainment device, and in a second instance the first usage control parameter restricts usage of content based on a detected type of the input peripherals that are coupled to the given entertainment device.

12. A system of supervisory control, comprising:

the entertainment device of claim 9; and the push server of claim 10.

13. The system of claim 12, further comprising:

the remote device of claim 11.

* * * * *